United States Patent [19]

Nolan et al.

[11] Patent Number: 5,394,681
[45] Date of Patent: Mar. 7, 1995

[54] RADIUS ROLLER

[75] Inventors: Charles Nolan, 24104 23rd Ave. SE., Bothell, Wash. 98021; James M. Rice, Brier, Wash.

[73] Assignee: Charles Nolan, Bothell, Wash.

[21] Appl. No.: 108,460

[22] Filed: Aug. 18, 1993

Related U.S. Application Data

[63] Continuation of Ser. No. 928,055, Aug. 11, 1992, abandoned.

[51] Int. Cl.6 ............... A01D 34/42; A01D 34/62
[52] U.S. Cl. .................................................. 56/249
[58] Field of Search ............... 56/7, 17.3, 249, 251, 56/252, 256, 294, DIG. 13, 16.7

[56] References Cited

U.S. PATENT DOCUMENTS

| | | | |
|---|---|---|---|
| 2,471,975 | 5/1949 | Packwood | 56/14.3 |
| 3,662,528 | 5/1972 | Akgulian et al. | 56/249 |
| 4,841,717 | 6/1989 | Lloyd | 56/256 |
| 4,947,630 | 8/1990 | Rich et al. | 56/249 |
| 5,042,236 | 8/1991 | Lamusga et al. | 56/7 |

FOREIGN PATENT DOCUMENTS

| | | | |
|---|---|---|---|
| 1384 | of 1859 | United Kingdom . | |
| 3201 | of 1861 | United Kingdom . | |
| 1584337 | 2/1981 | United Kingdom | 56/16.7 |

*Primary Examiner*—David J. Bagnell
*Attorney, Agent, or Firm*—Seed and Berry

[57] ABSTRACT

An improved groove-type roller for use in combination with a mower of the type including a cutting reel is disclosed. The groove-type roller includes a roller body having contacting edges separated by inner recesses wherein the contacting edges and inner recesses are designed so that no portion of the surface of the roller body opposes another portion of the surface of the roller body. The lifting roller further includes first and second sealed bearings mounted to first and second ends of the roller body. An elongated shaft extends through the entire length of the roller body and engages each of the first and second sealed bearings. The shaft is provided for mounting the groove-type roller to the mower. The sealed bearings are provided for interfacing the shaft with the roller body to permit rotation of the roller body with respect to the shaft. Preferably, the roller body is anodized treated aluminum to provide a hard surface that will resist mushrooming.

11 Claims, 2 Drawing Sheets

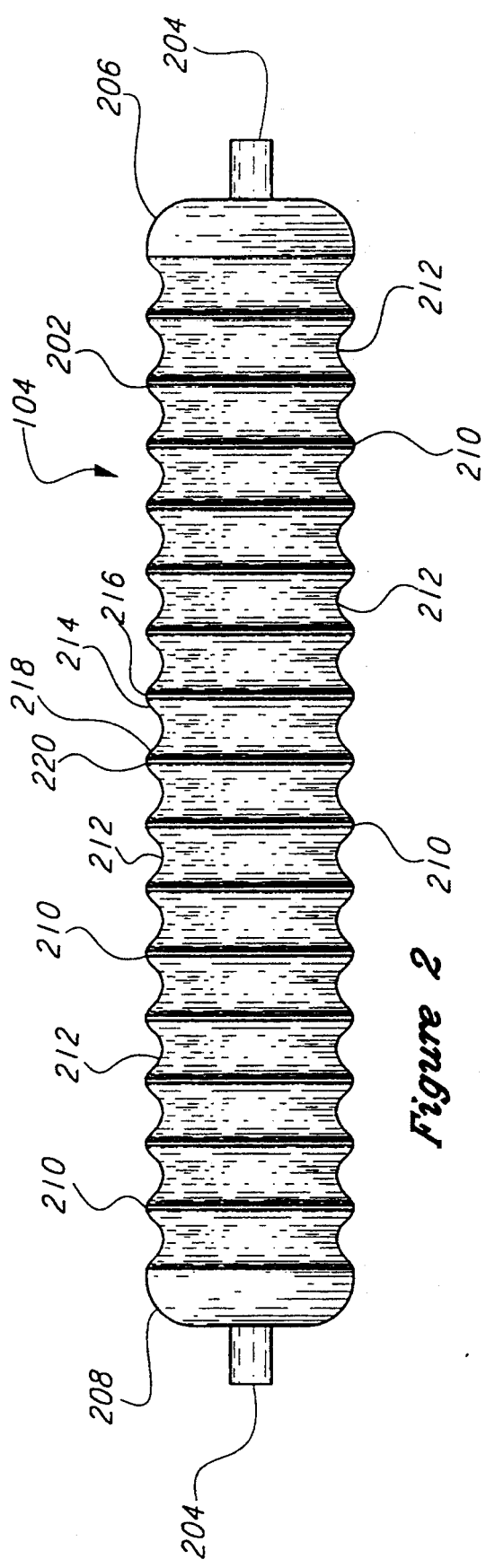
Figure 2
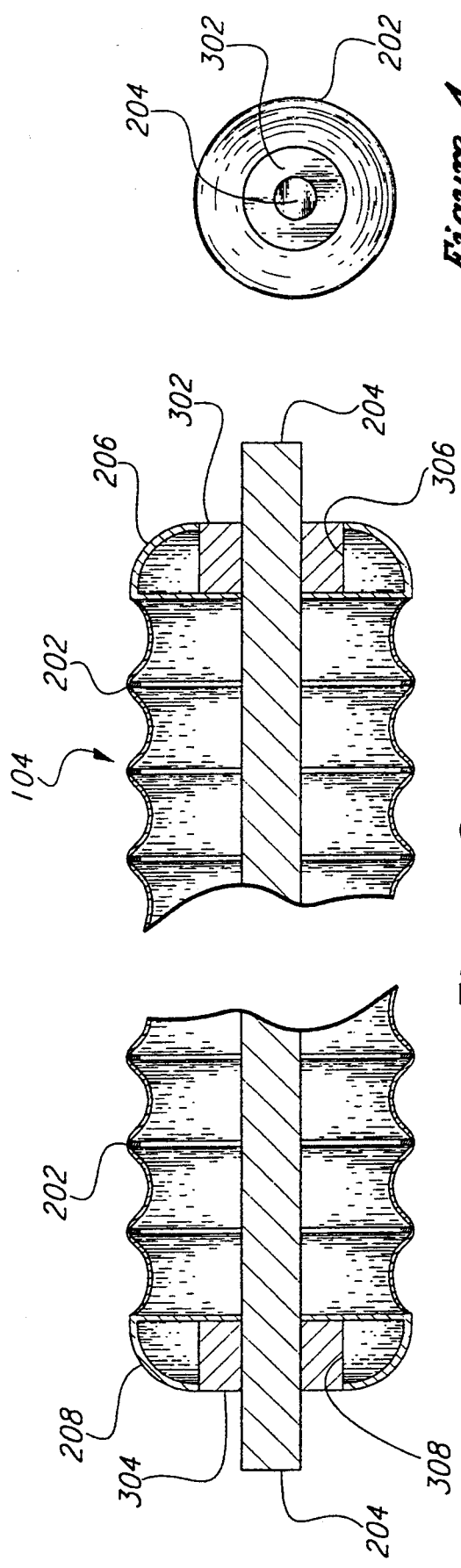
Figure 4
Figure 3

RADIUS ROLLER

RELATED APPLICATIONS

This is a continuation of U.S. patent application Ser. No. 07/928,055, now abandoned, which was filed in the United States Patent and Trademark Office on Aug. 11, 1992.

TECHNICAL FIELD

The present invention relates to rollers used in combination with lawn mowers for cutting grass and, more particularly, to rollers that are used to stand grass up before the grass is cut by the lawn mower.

BACKGROUND OF THE INVENTION

Rollers are generally used with commercial lawn mowers of the type that include cutting reels. The rollers are provided for supporting the cutting reel a predetermined distance above the ground to thereby position the cutting reel for cutting the grass to a desired length. Typically, the rollers are positioned either before or after the cutting reel of the lawn mower. Rollers that are positioned after the cutting reel usually have a tubular construction with the outer surface of the tubular roller being smooth for laying flat the cut grass.

Rollers that are positioned before the cutting reel, referred to herein as "groove-type rollers," are generally constructed with grooves and include a contacting edge for contacting the ground. The grooves are provided to minimize the amount of grass that is laid flat prior to cutting and, thereby, provide a more even cut.

The contacting edges of prior art groove-type rollers extend outward from the roller. These edges are typically thin and have sides that oppose one another. As a result, these prior art rollers have the tendency to pick up debris such as acorns, pinecones, small stones, and other small objects that may be in the turf. Since the sides of the extending edges oppose one another, the debris becomes jammed in the roller mechanism. To maintain the rollers operational, the operator is required to periodically remove the debris from the opposing sides of the roller. The debris can sometimes be removed manually, however, many times the operator must use a device specially constructed for removing debris from the rollers.

Additionally, these prior art groove-type rollers are often made from a mild steel or other soft metal. As a result, the contacting edges of these rollers tend to flatten when impacted by hard objects such as roots, stones, hard surfaces, or other objects that are harder than the metal. Such flattening is typically referred to as "mushrooming" since the contacting surface tends to take on the shape of a mushroom. The mushrooming of these prior art groove-type rollers increases the tendency of these rollers to pick up stones and makes it more difficult to dislodge the stones. Further, the mushrooming effect detracts from the effectiveness of the roller and decreases its life span.

Still further, prior art groove-type rollers such as those described above tend to dig in and cut up the turf when the mower is turning with the cutting reel engaged. Essentially, the contacting edges of the groove-type rollers act as plows that ruin the ground upon which the grass is growing. The tendency of these prior art groove-type rollers to dig up the ground is increased with the mushrooming effect described above. To prevent such a result, the mowers that employ these prior art groove-type rollers have been used to cut grass in straight lines only. When the mower needs to be turned, it must be driven off of the grass area, the cutting reel must be disengaged and/or lifted, the mower must be turned around, the mower must then be driven back to the grass area, and the roller and cutting reels are lowered and/or reengaged.

Still other prior art groove-type rollers have been constructed with a variety of component parts. These components require constant application of large amounts of grease, or other friction-reducing elements. The grease is applied to the end of the roller for the purpose of reducing friction among the component parts. Grease has also been used in combination with prior art rollers to reduce rusting and thereby increase the life span of the roller. However, the use of grease increases the tendency of the roller to accumulate dirt and other organic matter that decreases from the efficiency of the roller. The accumulation of dirt and other organic matter further adds to the tendency of these rollers to pick up small stones, as discussed above. Still further, the use of grease is undesirable because it tends to escape to the grass and eventually the environment.

Furthermore, the construction of prior art groove-type rollers is such that when the roller comes into contact with large obstacles such as tree roots, cart paths, rocks, or other large obstacles, a mounting portion of the roller that interfaces the roller with the mower tends to become bent, thereby causing the roller to become bent. Furthermore, shifting of the mounting portion interfacing the roller with the mower in itself can cause a flexing of the roller that temporarily or permanently affects the ability of the roller to stand up the grass for cutting. The bending condition causes the groove-type roller to wear faster, creates an uneven cutting of the grass, and a plowing effect that disturbs the lay of the ground and turf as is discussed above.

Accordingly, it is desirable to provide a groove-type roller for use with a commercial type lawn mower of the type that includes cutting reels wherein the lifting mower avoids the foregoing disadvantages of the prior art.

SUMMARY OF THE INVENTION

The present invention is a roller for use in combination with a mower head. The roller includes a roller body having a substantially smooth outer curvature. The roller body includes a plurality of raised contacting edges wherein adjacent ones of the raised contacting edges are separated by a plurality of inner recess. The inner recesses are constructed so that no portion of any one of the plurality of inner recesses is opposed to any other portion of the inner recess. The roller also includes a mounting assembly for mounting the roller body to the mower head. The mounting assembly is constructed to permit rotational movement of the roller body with respect to the mower head.

In another presently preferred embodiment of the invention, the plurality of raised contacting edges is constructed to have a substantially smooth curvature. In still another presently preferred embodiment of the invention, the mounting assembly includes a shaft that extends from one end of the roller body to the other end thereof. Additionally, the roller body is constructed of anodized aluminium to increase the life span of the roller.

BRIEF DESCRIPTION OF THE DRAWINGS

FIG. 2 is a more detailed illustration of the groove-type roller illustrated in FIG. 1;

FIG. 3 is a cross-section of the groove-type roller illustrated in FIG. 1; and

FIG. 4 is an end view of the groove-type roller illustrated in FIG. 1.

DETAILED DESCRIPTION OF THE INVENTION

Figure 1:
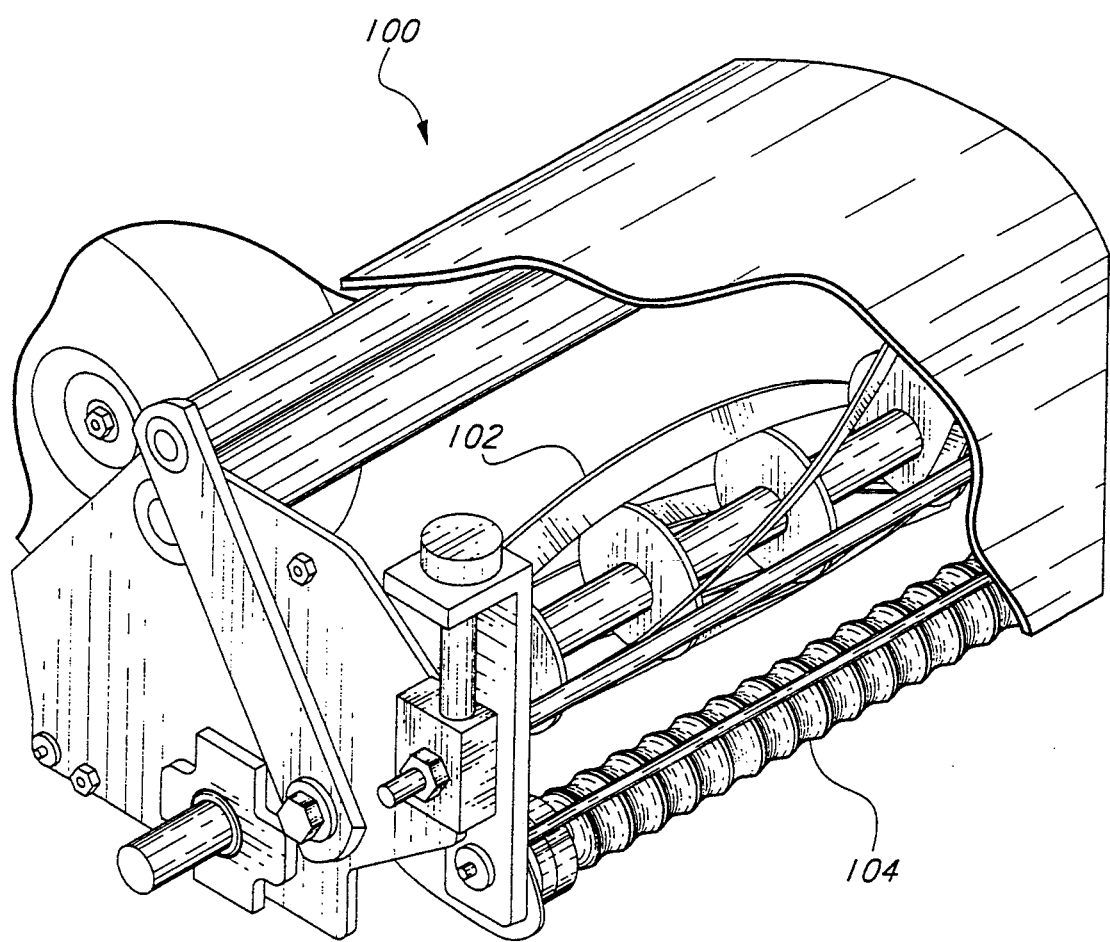
FIG. 1 is an illustration of a mower head including a groove-type roller that is the subject of the present invention.

FIG. 1 is an illustration of a mower head 100 of the type generally used with commercial lawn mowers. The mower head 100 includes a cutting reel 102 that is provided for cutting grass blades, as is known in the art. The mower head 100 also includes a groove-type roller 104 that is provided for supporting the cutting reel 102 a predetermined distance above the ground so that the grass is cut to a predetermined length.

Referring to FIG. 2, the groove-type roller 104 includes a roller body 202 mounted to a shaft 204. The shaft 204 is provided for mounting the groove-type roller 104 to the lawn mower 100. Advantageously, the shaft 204 extends from a first end 206 of the groove-type roller 104 to a second end 208 thereof. Accordingly, the shaft 204 adds rigidity to the groove-type roller 104 to reduce damage to the groove-type roller 104 as a result of bending, flexing, etc.

The roller body 202 is mounted to the shaft 204 by first and second sealed bearings 302 and 304, respectively. As illustrated in FIGS. 3 and 4, the roller body 202 includes first and second bores 306 and 308, respectively, positioned at the first and second ends 206 and 208 of the roller body 202. The first and second bores 306 and 308 are constructed for receiving the first and second sealed bearings 302 and 304. Ideally, the first and second bores 306 and 308 are constructed of a size slightly smaller than the first and second bearings 202 and 208 so that the first and second bearings 302 and 308 may be press fit into their respective first and second bores 306 and 308.

Each of the first and second bearings 302 and 304 comprises a sealed antifriction device having a central aperture for receiving the shaft 204. The first and second sealed bearings 302 and 304 are constructed for permitting rotation of the shaft 204 with respect to the roller body 202. The first and second sealed bearings 302 and 304 may comprise any of a number of known antifriction devices. As examples, the first and second sealed bearings may comprise sealed ball bearings, sealed needle antifriction devices, sealed roller antifriction devices, sealed tapered antifriction devices, etc. Other constructions for the sealed bearings 302 and 304 will readily become apparent to those skilled in the art.

The roller body 202 comprises an elongated, substantially tubular member having a plurality of raised contacting edges 210 (FIG. 2) each being separated by a inner recess 212. Advantageously, the construction of the contacting edges 210 and the inner recesses 212 is such that no portion of the roller body surface opposes any other portion of the roller body surface. More particularly, each inner recess 212 includes a first portion 214 extending from a first contacting edge 216 and a second portion 218 adjacent the first portion 214 and extending to an adjacent contacting edge 220. The construction of the inner recess 212 is such that no part of the first portion 214 is in opposition to the second portion 218. Those skilled in the art will appreciate that although the invention is shown herein by reference to curved inner recesses 212, other constructions for the inner recesses 212 could be provided that have no opposing sides. As an example, a "V" shape could be used for the inner recesses 212. Other shapes for the inner recesses 212 will readily become apparent to those skilled in the art.

Furthermore, the roller body 202 is constructed so that each of the contacting edges 210 is constructed of a substantially continuous curvature thereby having no sharp edges. The curvature of the contacting edges 210 prevents digging of the roller into dirt supporting the grass being cut and, therefore, permits the groove-type roller 104 to be turned while in contact with the dirt without damaging the dirt.

The roller body 202 may be constructed of any hard material that will resist flattening or "mushrooming" when the roller body comes into contact with another hard surface such as, for example, tree roots, cart paths, stones, etc. One presently preferred material for the roller body is aluminium wherein the aluminium is treated with a hard anodized coating. Other metals could be substituted for the aluminum, with or without anodizing. Still other materials for the roller body 202 will readily become apparent to those skilled in the art.

Although several presently preferred embodiments of the invention have been discussed in detail herein, those skilled in the art will recognize that many modifications and variations of the present invention may be made without departing from the true scope of the invention. It is the intention of the applicants, by the claims appended hereto, to embody all such modifications and variations as fall within the true scope and spirit of the invention.

We claim:

1. A roller for use in combination with a mower head of the type including a cutting reel, said roller being constructed to be positioned to contact grass prior to the time that the grass is contacted by the cutting reel, said roller comprising:

a roller body constructed from anodized aluminum, said roller body being a substantially tubular, elongate body member having a plurality of raised contacting edges wherein adjacent ones of said raised contacting edges are separated by a plurality of inner recesses, said raised contacting edges being constructed to have a substantially smooth curvature, said inner recesses being constructed so that no portion of any one of said plurality of inner recesses is opposed to any other portion of said any one of said plurality of inner recesses, said roller body including first and second ends wherein said first and second ends include a respective first and second bore;

first and second sealed bearings each including a central aperture and being positioned within a respective one of said first and second bores; and a shaft of length greater than the length of said roller body, said shaft being positioned to extend through said roller body and to mate with said central apertures of said first and second sealed bearings, said shaft being further constructed to mate with the mower head thereby to interface said roller body with the mower head.

2. A roller for use in combination with a mower head comprising:

a roller body having a plurality of raised contacting edges wherein adjacent ones of said raised contacting edges is separated by a plurality of inner recesses, said raised contacting edges being constructed to have a substantially smooth curvature, said inner recesses having surfaces and being constructed so that no portion of the surface of any one of said plurality of inner recesses is opposed to any other portion of said surface; and mounting means for mounting said roller body to the mower head, said mounting means being further constructed to permit rotational movement of said roller body with respect to the mower head.

3. The roller as recited in claim 2 wherein said roller body is constructed from anodized aluminum.

4. The roller as recited in claim 2 wherein said roller body is constructed from an anodized metal.

5. The roller as recited in claim 2 wherein said mounting means comprises:

a shaft of length greater than the length of said roller body, said shaft being positioned to extend through said roller body and to mate with the mower head thereby to interface said roller body with the mower head; and bearing means coupled intermediate said roller body and said shaft for permitting said shaft to rotate with respect to said roller body.

6. The roller as recited in claim 5 wherein said roller body includes first and second ends and wherein each of said first and second ends includes a bore, said bearing means comprising first and second sealed bearings each including a central aperture and being positioned within a respective one of said first and second bores, said shaft being positioned to extend through the respective first and second apertures of said first and second sealed bearings.

7. A roller for use in combination with a mower head comprising:

a roller body having a substantially smooth outer curvature, said roller body including a plurality of raised contacting edges wherein adjacent ones of said raised contacting edges is separated by a plurality of inner recesses each including a recess surface, said inner recesses being constructed so that no portion of said recess surface of any one of said plurality of inner recesses is opposed to any other portion of said recess surface of said any one of said plurality of inner recesses; and mounting means for mounting said roller body to the mower head, said mounting means being further constructed to permit rotational movement of said roller body with respect to the mower head.

8. The roller as recited in claim 7 wherein said roller body is constructed from anodized aluminum.

9. The roller as recited in claim 7 wherein said roller body is constructed from an anodized metal.

10. The roller as recited in claim 7 wherein said mounting means comprises:

a shaft of length greater than the length of said roller body, said shaft being positioned to extend through said roller body and to mate with the mower head thereby to interface said roller body with the mower head; and bearing means coupled intermediate said roller body and said shaft for permitting said shaft to rotate with respect to said roller body.

11. The roller as recited in claim 10 wherein said roller body includes first and second ends and wherein each of said first and second ends includes a bore, said bearing means comprising first and second sealed bearings each including a central aperture and being positioned within a respective one of said first and second bores, said shaft being positioned to extend through the respective first and second apertures of said first and second sealed bearings.

* * * * *